(12) United States Patent
Makelainen et al.

(10) Patent No.: US 10,642,386 B2
(45) Date of Patent: May 5, 2020

(54) TOUCH SENSOR STRUCTURE

(71) Applicant: Nokia Technologies Oy, Espoo (FI)

(72) Inventors: Esa Makelainen, Helsinki (FI); Hannu Haapakoski, Salo (FI)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 15/107,509

(22) PCT Filed: Nov. 25, 2014

(86) PCT No.: PCT/FI2014/050904
§ 371 (c)(1),
(2) Date: Jun. 23, 2016

(87) PCT Pub. No.: WO2015/101701
PCT Pub. Date: Jul. 9, 2015

(65) Prior Publication Data
US 2016/0320873 A1    Nov. 3, 2016

(30) Foreign Application Priority Data
Dec. 30, 2013  (GB) .................. 1323105.5

(51) Int. Cl.
*G06F 3/041* (2006.01)
*G06F 1/16* (2006.01)

(52) U.S. Cl.
CPC ............ *G06F 3/041* (2013.01); *G06F 1/1626* (2013.01); *G06F 3/0416* (2013.01); *G06F 2203/04102* (2013.01); *G06F 2203/04103* (2013.01)

(58) Field of Classification Search
CPC .......................................... G06F 2203/04103
See application file for complete search history.

(56) References Cited

U.S. PATENT DOCUMENTS

| | | | |
|---|---|---|---|
| 8,576,190 B2 * | 11/2013 | Sugihara | G06F 3/045 345/173 |
| 9,594,406 B2 * | 3/2017 | Yamada | G06F 3/044 |
| 2002/0000979 A1 | 1/2002 | Furuhashi et al. | 345/173 |
| 2003/0071784 A1 * | 4/2003 | Sato | G06F 3/0338 345/156 |
| 2011/0157065 A1 | 6/2011 | Murata et al. | 345/173 |
| 2012/0249465 A1 | 10/2012 | Lin et al. | 345/173 |
| 2013/0083496 A1 * | 4/2013 | Franklin | G06F 1/1626 361/749 |
| 2014/0043772 A1 * | 2/2014 | Isoda | H05K 7/00 361/728 |

(Continued)

FOREIGN PATENT DOCUMENTS

| | | |
|---|---|---|
| EP | 1 351 121 A2 | 10/2003 |
| EP | 1 357 420 A1 | 10/2003 |
| WO | WO 2013/190884 A1 | 12/2013 |

*Primary Examiner* — Amr A Awad
*Assistant Examiner* — Maheen I Javed
(74) *Attorney, Agent, or Firm* — Harrington & Smith

(57) ABSTRACT

An apparatus is disclosed which includes a first substrate having an outer touch surface and an inner surface; a touch sensor substrate having a first surface and an opposing second surface; wherein the first substrate and the touch sensor substrate are configured to form a part of a laminated structure; and wherein a first region of the first surface of the touch sensor substrate is configured to have a shape different to an adjacent region of the inner surface of the first substrate.

14 Claims, 4 Drawing Sheets

(56) References Cited

U.S. PATENT DOCUMENTS

| | | | |
|---|---|---|---|
| 2015/0062525 A1* | 3/2015 | Hirakata | G02F 1/133305 349/158 |
| 2015/0185889 A1* | 7/2015 | Nakamura | G06F 3/044 345/173 |
| 2015/0293558 A1* | 10/2015 | Hahn | B29C 45/1418 345/174 |
| 2016/0062516 A1* | 3/2016 | Jeong | G06F 3/044 345/174 |

\* cited by examiner

TOUCH SENSOR STRUCTURE

TECHNOLOGICAL FIELD

Various examples of the present disclosure relate to an apparatus for a touch sensor structure. In particular, though without prejudice to the foregoing, certain examples relate to an apparatus for a laminated touch sensor panel.

BACKGROUND

Typically, touch sensors, such as capacitive touch sensors for detecting a user's touch, are of a generally flat shape provided on a flat substrate. Curved touch sensors and curved substrates present difficulties in their electrical and mechanical interconnection to circuitry, such as a touch sensor controller, which affect the reliability and durability of the curved touch sensors.

The listing or discussion of any prior-published document or any background in this specification should not necessarily be taken as an acknowledgement that the document or background is part of the state of the art or is common general knowledge. One or more aspects/examples of the present disclosure may or may not address one or more of the background issues.

BRIEF SUMMARY

According to at least some examples of the disclosure there is provided an apparatus comprising:
  a first substrate having an outer touch surface and an inner surface;
  a touch sensor substrate having a first surface and an opposing second surface;
  wherein the first substrate and the touch sensor substrate are configured to form a part of a laminated structure; and
  wherein a first region of the first surface of the touch sensor substrate is configured to have a shape different to an adjacent region of the inner surface of the first substrate.

According to at least some examples of the disclosure there is provided a module comprising the apparatuses as mentioned above.

According to at least some examples of the disclosure there is provided a touch sensitive display comprising: the module or apparatuses as mentioned above.

According to at least some examples of the disclosure there is provided a device comprising: the touch sensitive display, the module or apparatuses as mentioned above.

According to at least some examples of the disclosure there is provided a method for manufacturing the: device, touch sensitive display, module or apparatuses as mentioned above.

BRIEF DESCRIPTION OF THE DRAWINGS

For a better understanding of various examples that are useful for understanding the detailed description reference will now be made by way of example only to the accompanying drawings in which.

DETAILED DESCRIPTION

Figure 1:
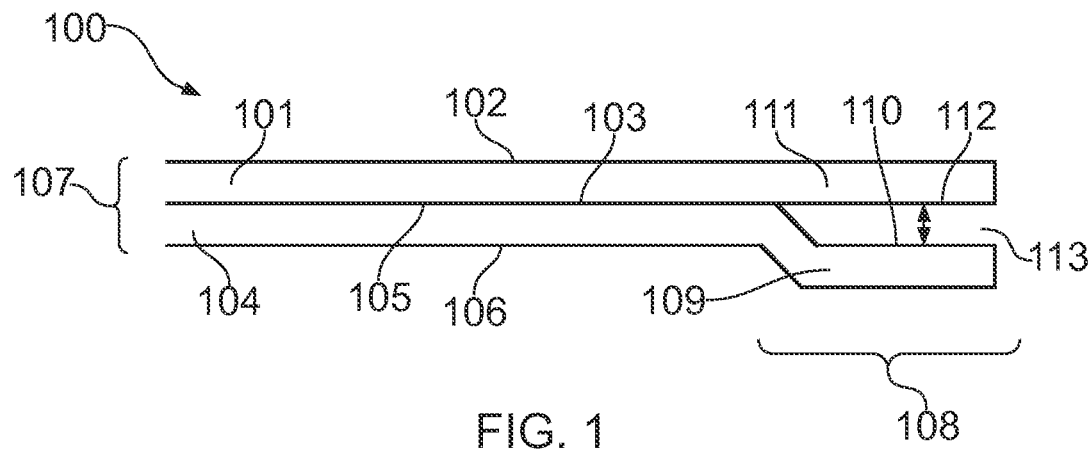
FIG. 1 schematically illustrates a section of apparatus according to an example of the disclosure.

The Figures schematically illustrate an apparatus 100 comprising:
  a first substrate 101 having an outer touch surface 102 and an inner surface 103;
  a touch sensor substrate 104 having a first surface 105 and an opposing second surface 106;
  wherein the first substrate 101 and the touch sensor substrate 104 are configured to form a part of a laminated structure 107; and
  wherein a first region 108,109 of the first surface 110 of the touch sensor substrate is configured to have a shape different to an adjacent region 108,111 of the inner surface 112 of the first substrate.

The first substrate may be transparent, optically clear or translucent and could for example comprise a glass or plastic window for a touch sensitive display.

The touch sensor substrate may be a substrate onto which one or more touch sensors may be disposed or may itself include one or more touch sensors. The touch sensors may be suitable for detecting a touch of an object or a proximity of an object, such as a user's digit/stylus, for example by detecting a change in capacitance of the touch sensors. The sensor may be based on an alternative technology, e.g. resistive touch sensing. The one or more touch sensors may themselves comprise various layers comprising for example Indium Tin Oxide (ITO) and a pattern layer of a conductive medium. The touch sensor substrate, and the touch sensor(s), may also be transparent, optically clear or translucent.

In various examples of the disclosure the apparatus provides a laminated structure having a region in which the shape of the first substrate is different to that of a touch sensor substrate (wherein the shapes are the same for the rest of the apparatus). Certain examples provide a region of the touch sensor substrate having a flat first surface shape even if the first substrate is curved.

Interconnections between touch sensor(s) of a touch sensor substrate and touch sensor controller circuitry are typically accomplished via a Flexible Printed Circuit (FPC) using Anisotropic Conductive Film/Anisotropic Conductive Paste (ACF/ACP) bonding. Since FPC's are difficult to bend to conform to a non-flat shape (as doing so results in high residual stresses and can lead to reliability issues) and controller circuitry/integrated circuits crack easily when bent, non-flat surfaces present difficulties for bonding/mounting such components thereto. However, in order to ensure a robust and reliable bond where non-flat touch surfaces and corresponding non flat touch sensor substrates are present, examples of the present disclosure can provide a flat area of the touch sensor substrate which is advantageously able to provide:
  a flat bonding area, e.g. an electrical interconnection area for enabling ACF bonded PFC tail interconnection; and/or a flat mounting area, e.g. for mounting circuitry such as a touch sensor controller.

An example of an apparatus will now be described with reference to the Figures which focus on components necessary for describing certain features of the apparatus. Similar reference numerals are used in the Figures to designate similar features. For clarity, all reference numerals are not necessarily displayed in all figures.

FIG. 1 schematically illustrates a cross-sectional view of a part of an apparatus 100 comprising a first substrate 101 and a touch sensor substrate 104. The first substrate has an outer touch surface 102, i.e. in use is accessible to receive user touch input, and an inner surface 103.

The touch sensor substrate has a first surface 105, located on a side proximal to the first substrate, and an opposing second surface 106, located on a side distal to the first substrate. The touch sensor substrate 104 may comprise one or more touch sensors (not shown) or provides a substrate onto which one or more touch sensors may be provided, e.g. on the first surface 105.

The touch sensor substrate may be formed separately from the first substrate. The touch sensor substrate may be bonded directly to the first substrate, e.g. via an Optically Clear Adhesive (OCA) or may be bonded indirectly to the first substrate via interleaving layers, e.g. a touch sensor layer in the case where the touch sensor substrate does not itself comprise touch sensors. The first substrate and the touch sensor substrate form a part of a laminated structure 107, such as a touch sensitive panel.

A first region 108,109 of the touch sensor substrate is configured such that its first surface 110 has a shape different to the shape of a corresponding region 108,111 of the inner surface 112 of the first substrate. As shown in FIG. 1, the first substrate has a consistent flat shape, whereas in the first region 108 the touch sensor substrate's shape deviates from that of the first substrate's shape by having a bend or kink therein such that it branches away from the first substrate. Thus, the shape of the first surface 110 in the vicinity of the first region 108 is not the same as the shape of the inner surface 112 in the first region 108 (in this case particularly around the bend/kink of the portion 109 of the touch sensor substrate).

The differing shape of the portion 109 of the touch sensor substrate to that of the portion 111 of the first substrate gives rise to an increase in a separation distance between the two substrates in the first region 108 (shown by double headed arrow) and gives rise to the creation of a gap 113 between the two substrates. The first region 108 of the apparatus with its increased separation distance between the substrates and its gap may be located proximal to or at a periphery/edge of each substrate.

Figure 2:
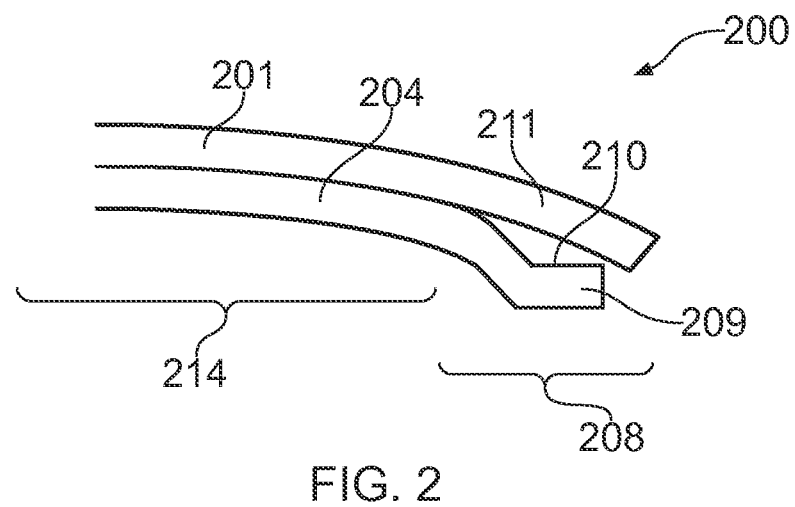
FIG. 2 schematically illustrates a section of another apparatus according to an example of the disclosure.

FIG. 2 shows a partial view of another apparatus 200, wherein the whole of the first substrate 201 has a non-flat/curved shape on both its outer and inner surfaces. Both a first region 208,211 and a second region 214 of the first substrate 201 are non-flat/curved, i.e. the first substrate is curved along its entire length such that there are no flat/planar areas on its outer and inner surfaces. The curve of the first substrate could be around single axis such as a primary/elongate axis of the first substrate. Additionally there could be further curves about further axes, such as an axis perpendicular to the primary/elongate axis so that the substrate curves about both its length and its breadth.

A second region 214 of the touch sensor substrate 204 is also non-flat/curved on both its major surfaces such that the second region of the touch sensor substrate has a shape matching that of its corresponding adjacent region of the first substrate. However, a first region 208,209 of the touch sensor substrate 204 has a different shape to that of its adjacent region 208,211 of the first substrate. In this example the first region has a flat surface 210.

Figure 3:
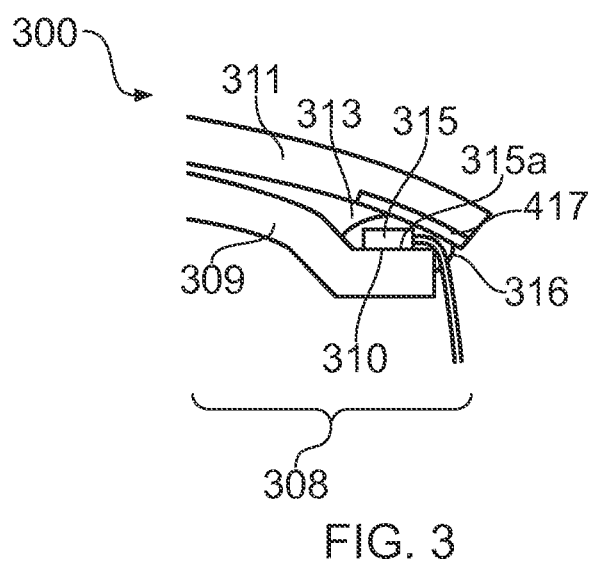
FIG. 3 schematically illustrates a section of another apparatus according to an example of the disclosure.
Figure 4:
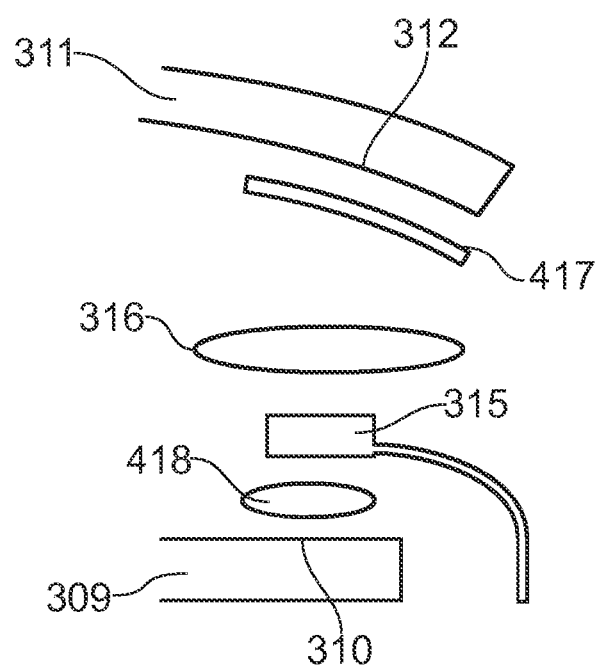
FIG. 4 schematically illustrates an exploded view of the apparatus of FIG. 3.

FIG. 3 shows a first region 308 of an apparatus 300 and FIG. 4 shows an exploded view of the same. A portion of the touch sensor substrate 309 has a first surface 310 configured to be flat. Advantageously, this flat surface, located between the first substrate portion 311 and the touch sensor substrate portion 309, provides a flat electrical interconnection area for enabling interconnection to circuitry (not shown) which is separate from the touch sensor substrate, for example a touch sensor controller, remote from the substrate, for processing touch sensor signals (the touch sensor(s) either being a part of the touch sensor substrate or disposed thereon).

A gap 313 between the substrates provides a location for an electrical interconnector 315, which itself has a flat connection/bonding area 315a. The electrical interconnector 315 may be a tail of a Flexible Printed circuit (FPC). The electrical interconnector may be bonded to and electrically connected to flat surface 310 of the touch sensor substrate using Anisotropic Conductive Film/Anisotropic Conductive Paste (ACF/ACP) 418. Advantageously, the apparatus 300 provides coplanarity between the flat electrical interconnection area 310 of the touch sensor substrate 309 and a flat electrical interconnection area 315a of the electrical interconnector 315, e.g. FPC tail.

Alternatively, or in addition to the electrical interconnecter, the flat surface 310 may provide a flat mounting area for mounting an electrical component/circuitry/chip to the touch sensor substrate, e.g. mounting a touch sensor controller (not shown). Advantageously, the apparatus again provides coplanarity between the flat mounting area of the touch sensor substrate and a flat mounting area of the electrical component, e.g. touch sensor controller.

A protective material 316 such as a resin or a Liquid Optically Clear Adhesive (LOCA), may be provided at least between the flat surface 310 and the inner surface of the first substrate portion 311, e.g. to overlay at least one of: the flat surface 310, a bonded electrical interconnect (e.g. FPC) 315 and a mounted electrical component (e.g. touch sensor controller). The provision of such a protective medium not only advantageously maintains good adhesion and further strengthens the mechanical bond between the FPC/controller circuitry and touch sensor substrate, but it also provides resistance to heat and moisture as well as protects against mechanical movements and impacts thereby providing a more robust electrical interconnection and mechanical bond. A further advantage of the protective resin is enhanced protection against electrostatic discharges (ESD), e.g. ESD's close to the apparatus' edge.

For capacitive based touch sensors, relative movement of electrical components proximal to the sensors can affect the sensed capacitance. Thus, were an electrical component, such as a bonded electrical interconnector, e.g. FPC tail, or mounted circuitry, e.g. touch sensor controller, to have a loose connection and move, this would affect the detected local capacitance and may in turn cause false touch detections or drops in sensitivity. Thus, the enhanced mechanical stability provided by the protective medium can also help improve reliability of the sensor by reducing such false detections and avoiding such reduction in sensitivity.

The protective medium 316 may be provided so as to fill in the gap 313 between the substrates' regions 311 and 309 such that there is no void space.

The apparatus may comprise a part of a touch sensor panel, i.e. it may comprise some of the layers in a laminated structure. Where the first region is located between two glass layers which are laminated together, the provision of protective medium 316, e.g. resin, filling the gap provides a compression mechanism aiding the bond in the interconnection area/mounting area during the lamination process.

Where the touch sensor panel comprises substantially transparent layers, it may form a part of a touch sensitive display of an electrical device. The apparatus may be provided in a module. As used here 'module' refers to a unit or apparatus that excludes certain parts/components that would be added by an end manufacturer or a user.

The first region 308 of the first substrate portion 311 may be provided with a decoration 417, for example on an inner surface 312 of the first substrate portion. The decoration may comprise for example: a surface decoration, a printed layer, an image, text, an indicia or a block of colour. The decoration may be transparent, semi-transparent or opaque. Where the decoration is opaque/non-transparent, advantageously it acts as a mask to hide from view elements of the apparatus which lie beneath the portion 311 (some elements of which may not be transparent and thus would otherwise be visible through the portion 311) such as: the portion 309 of the touch sensor substrate, the electrical interconnection 315, circuitry/components mounted on the flat surface of the touch sensor substrate and the material 316.

Figure 5A:
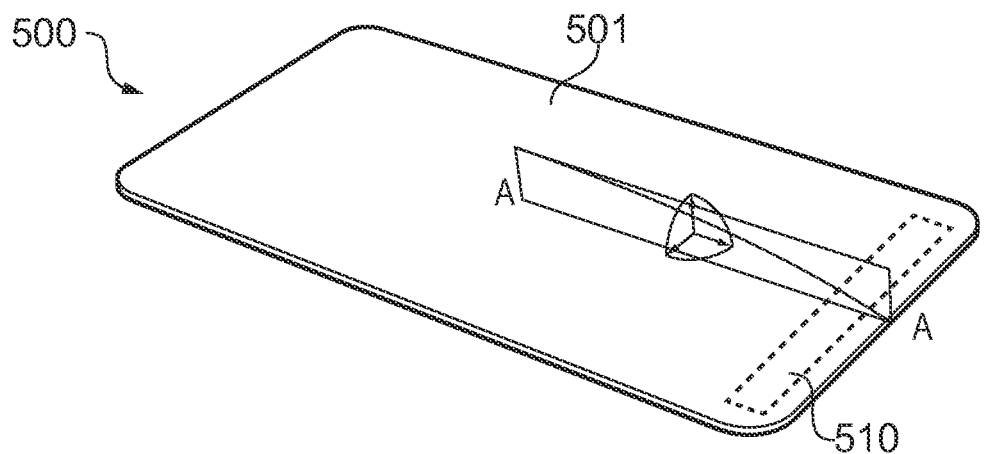
FIG. 5A schematically illustrates a perspective view of an apparatus according to an example of the disclosure.
Figure 5B:
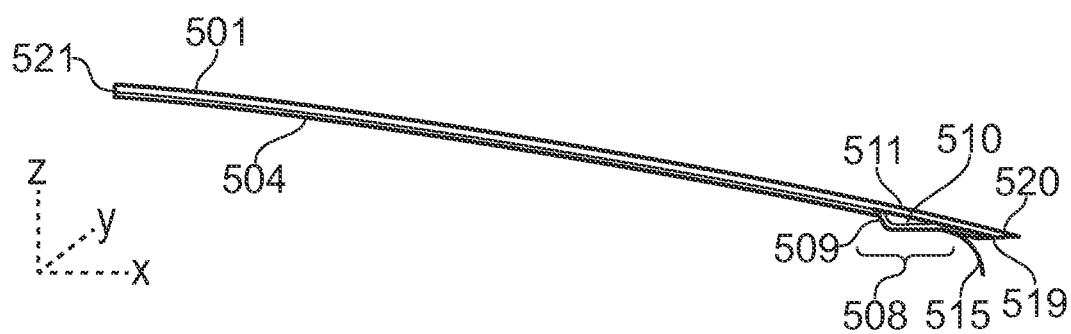
FIG. 5B schematically illustrates a section of a cross-sectional view of the apparatus of FIG. 5A.

FIG. 5A schematically illustrates a perspective view of an apparatus 500 and FIG. 5B illustrates a partial cross-sectional view of the same along the plane A-A. A flat surface 510, figuratively shown with dotted lines, of a first region 508 of a touch sensor substrate 504 lies beneath a first substrate 501. The flat surface has a generally rectangular shape. The first region 508, where the shapes of the first substrate and the touch sensor substrate differ thereby generating a gap between the substrates, is located proximal to but not at a peripheral edge of the substrates. Significantly, whilst the touch sensor substrate at portion 509 diverges away from its adjacent portion 511 of the first substrate, e.g. bends/kinks so as to branch out from the first substrate thereby forming a gap between the substrates, the touch sensor substrate then reverts back to the first substrate at its peripheral region 519 and re-follows the shape of the first substrate at its periphery 520. In this manner, the shape of the substrates at their peripheral edges 519, 520 are once more the same, such that the separation distance reverts back to its value as per the rest of the apparatus in its second region and the gap closes. In effect, one might consider that the 'tight knit' lamina structure reforms around the edge of the apparatus following the separation between the substrates around the first region 508. The separation between the substrates, which defines a gap therebetween, provides a location for mounting an electrical interconnection, such as a Flexible Printed Circuit (FPC) 515.

FIG. 5B shows a touch sensor layer 521, comprising touch sensors, which are supported on the touch sensors substrate 504 and disposed between the touch sensors substrate 504 and first substrate 501.

Figure 6:
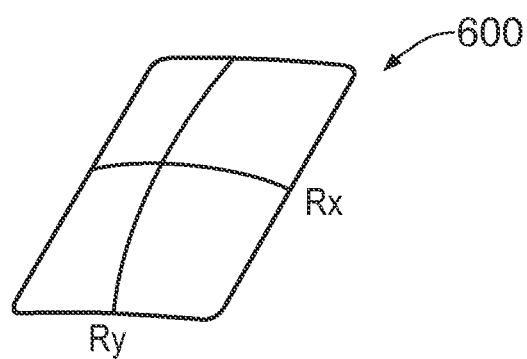
FIG. 6 schematically illustrates another apparatus according to an example of the disclosure.

FIG. 6 schematically illustrates another apparatus 600 which is curved about a primary/elongate axis Ry and also curved about a further axis Rx which is perpendicular to the primary/elongate axis Ry, i.e. so that the first substrate and touch sensor substrate are curved about both their length and breadth (except for flat first regions of the touch sensor substrate).

Figure 7:
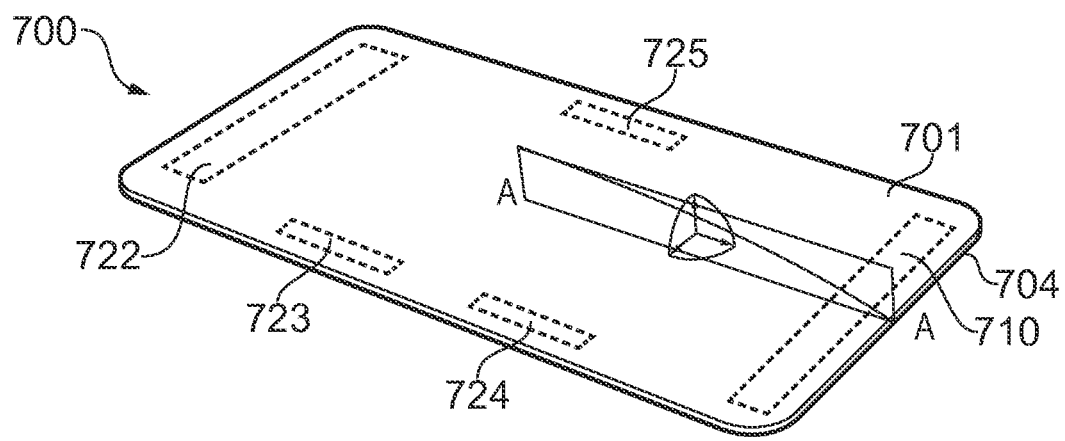
FIG. 7 schematically illustrates another apparatus according to an example of the disclosure.

FIG. 7 schematically illustrates another apparatus 700, that is curved about at least its primary axis, in which there are several regions 710, 722, 723, 724 and 725 having flat surfaces of the touch sensor substrate 704 and gaps between the touch sensor substrate 704 and the first substrate 701 that are located proximal to various peripheral edges of the apparatus. This enables the apparatus to provide several flat electrical interconnection and/or mounting areas at multiple edges of the apparatus. For example, where the touch sensor substrate comprises plural touch sensor pads, each requiring its own touch sensor controller, the plural touch sensor controllers can be mounted to the plural flat areas around the edge of the substrate.

In certain examples, the apparatus is embodied as a device. The device may be a hand held portable electronic device, such as a mobile telephone, wireless communication device or personal digital assistant, that may additionally provide one or more: audio, text, video and communication functions (e.g. tele-communication, video-communication, and/or text transmission (Short Message Service (SMS)/ Multimedia Message Service (MMS)/emailing) functions), interactive/non-interactive viewing functions (e.g. web-browsing, navigation, TV/program viewing functions), music recording/playing functions (e.g. Moving Picture Experts Group-1 Audio Layer 3 (MP3) or other format and/or (frequency modulation/amplitude modulation) radio broadcast recording/playing), downloading/sending of data functions, image capture function (e.g. using a (e.g. in-built) digital camera), and gaming functions.

The wording 'connect', 'bond' and their derivatives used in this document mean operationally connected/coupled/in communication. It should be appreciated that any number or combination of intervening components can exist (including no intervening components). For instance, examples of the apparatus may additionally comprise further lamina layer(s) above the first substrate and further lamina layer(s) below the touch sensor substrate as well as additional layer(s) between the first substrate and touch sensor substrate.

The term 'comprise' is used in this document with an inclusive not an exclusive meaning. That is any reference to X comprising Y indicates that X may comprise only one X or may comprise more than one X. If it is intended to use 'comprise' with an exclusive meaning then it will be made clear in the context by referring to "comprising only one" or by using "consisting".

Features described in the preceding description may be used in combinations other than the combinations explicitly described.

Although functions have been described with reference to certain features, those functions may be performable by other features whether described or not. Although features have been described with reference to certain examples, those features may also be present in other examples whether described or not. Although various examples of the present invention have been described in the preceding paragraphs with reference to various examples, it should be appreciated that modifications to the examples given can be made without departing from the scope of the invention as claimed.

In this brief description, reference has been made to various examples. The description of features or functions in relation to an example indicates that those features or functions are present in that example. The use of the term 'example' or 'for example' or may in the text denotes, whether explicitly stated or not, that such features or functions are present in at least the described example, whether described as an example or not, and that they can be, but are not necessarily, present in some of or all other examples. Thus 'example', 'for example' or may refers to a particular instance in a class of examples. A property of the instance can be a property of only that instance or a property of the class or a property of a sub-class of the class that includes some but not all of the instances in the class.

Whilst endeavouring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has been placed thereon.

We claim:

1. An apparatus comprising:
a first substrate having an outer touch surface and an inner surface, said first substrate having a length and being curved along all of said length; and
a touch sensor substrate having a first surface and an opposing second surface, said first surface of said touch sensor substrate facing said inner surface of said first substrate, said first surface of the touch sensor substrate having at least one first region, located proximal to an edge of said touch sensor substrate, with a shape different from that of a facing region of the inner surface of the first substrate by diverging therefrom before an electrical interconnection is disposed thereon, thereby forming a gap between said first surface of said touch sensor substrate and said inner surface of said first substrate at said at least one region, said touch sensor substrate otherwise being curved in a manner corresponding to that of said first substrate, said at least one first region having a flat surface facing, and not extending beyond, said inner surface of said first substrate on a side of said gap along said edge of said touch sensor substrate, said inner surface of said first substrate being bonded to said first surface of said touch sensor substrate except in said at least one region, whereby the first substrate and the touch sensor substrate form, in part, a laminated structure.

2. The apparatus as claimed in claim 1, wherein the first substrate is curved around at least one axis.

3. The apparatus as claimed in claim 1, wherein the flat surface comprises a flat electrical interconnection area for enabling electrical interconnection to circuitry.

4. The apparatus as claimed in claim 1, wherein the flat surface comprises a flat mounting area for mounting circuitry to the touch sensor substrate.

5. The apparatus as claimed in claim 1, further comprising the electrical interconnection, disposed on the flat surface, for electrical connection to circuitry.

6. The apparatus as claimed in claim 1, further comprising a touch sensor controller disposed on the flat surface.

7. The apparatus as claimed in claim 1, further comprising a protective medium disposed between the flat surface and the inner surface.

8. The apparatus as claimed in claim 1, wherein a first region of the first substrate, adjacent to the first region of the touch sensor substrate, is provided with decoration.

9. The apparatus as claimed in claim 1, wherein the first surface of the touch sensor substrate has one or more additional regions, located proximal to an edge of said touch sensor substrate and not laminated to an adjacent region of the inner surface of the first substrate, with shapes different from those of facing regions of the inner surface of the first substrate by diverging therefrom before an electrical interconnection is disposed thereon, thereby forming one or more additional gaps between said first surface of said touch sensor substrate and said inner surface of said first substrate at said one or more additional regions, said one or more additional regions having flat surfaces facing, and not extending beyond, said inner surface of said first substrate on sides of said one or more additional gaps along said edge of said touch sensor substrate.

10. The apparatus as claimed in claim 1, wherein the laminated structure has non-flat first and second opposing major surfaces.

11. A module comprising the apparatus as claimed in claim 1.

12. A touch sensitive display comprising:
the apparatus as claimed in claim 1; and
a display.

13. A device comprising the apparatus as claimed in claim 1.

14. The device of claim 13, wherein the device is configured for at least one of: wireless communication, mobile telephony and portable handheld use.

* * * * *